United States Patent
Karaoguz et al.

(10) Patent No.: US 7,480,514 B2
(45) Date of Patent: Jan. 20, 2009

(54) GPS ENABLED CELL PHONE WITH COMPASS MODE MAPPING FUNCTION

(75) Inventors: Jeyhan Karaoguz, Irvine, CA (US); James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 446 days.

(21) Appl. No.: 11/069,356

(22) Filed: Mar. 1, 2005

(65) Prior Publication Data
US 2006/0166703 A1    Jul. 27, 2006

Related U.S. Application Data

(60) Provisional application No. 60/647,089, filed on Jan. 26, 2005.

(51) Int. Cl.
*H04B 1/38* (2006.01)
*H04M 1/00* (2006.01)

(52) U.S. Cl. ............... 455/457; 455/404.2; 455/456.1; 455/456.2; 701/211; 701/212; 701/213

(58) Field of Classification Search ............... 455/404.2, 455/456.1, 456.2, 457, 566; 701/200, 204, 701/207, 208, 211, 212, 213
See application file for complete search history.

(56) References Cited

U.S. PATENT DOCUMENTS 6,282,493 B1 *   8/2001   Kitagawa et al. ............ 701/211
2002/0102989 A1 *   8/2002   Calvert et al. ............... 455/456
2002/0169547 A1 *   11/2002   Harada ........................ 701/211
2002/0175854 A1 *   11/2002   Shioda et al. ............. 342/357.1
2003/0036846 A1 *   2/2003   Ikeda ........................... 701/208
2003/0148772 A1 *   8/2003   Ben-Ari ....................... 455/456
2003/0208409 A1 *   11/2003   Mault ............................ 705/26
2005/0102100 A1 *   5/2005   Norimoto ..................... 701/209
2005/0165543 A1 *   7/2005   Yokota ........................ 701/204

FOREIGN PATENT DOCUMENTS

JP          0944032 A1 *   1/1999

* cited by examiner

*Primary Examiner*—Tuan A Pham
(74) *Attorney, Agent, or Firm*—Garlick Harrison & Markison; Bruce E. Garlick; Holly L. Rudnick (57) ABSTRACT

A wireless terminal displays its location and a map segment on a display of the wireless terminal. Operation commences with the wireless terminal accessing its GPS receiver to determine its location coordinates. Based upon its location coordinates, the wireless terminal accesses a map segment. The wireless terminal determines its orientation with respect to a reference direction. The wireless terminal displays the map segment on its display such that the map segment is displayed in a correct orientation with respect to mapped physical features. The wireless terminal displays an icon on its display that represents the wireless terminal. The icon is displayed on the map segment at a location corresponding to the location coordinates of the wireless terminal. The display of the wireless terminal orients the mapped physical features on the display so that they are oriented correctly with respect to the actual physical features.

22 Claims, 9 Drawing Sheets

GPS ENABLED CELL PHONE WITH COMPASS MODE MAPPING FUNCTION

CROSS REFERENCE TO RELATED APPLICATION

This application claims priority to U.S. Provisional Patent Application Ser. No. 60/647,089, filed Jan. 26, 2005, which is incorporated herein by reference for all purposes.

BACKGROUND

1. Field of the Invention

The present invention relates generally to wireless communications; and more particularly to operations relating to the location/mobility of a wireless terminal.

2. Background of the Invention

Communication systems are well known. Communication systems include both wired communication systems and wireless communication systems. Wired communication systems include the Public Switched Telephone Network (PSTN), Wide Area Networks (WANs), Local Area Networks (LANs), and other networks that use wired or optical media for the transmission of data. Wireless communication systems include cellular telephone systems, satellite communication systems, Wireless Local Area Networks (WLANs), Wireless Personal Area Networks (WPANs), and other networks that employ a wireless link between a serviced terminal and a network infrastructure. Of course, many communications are serviced using a combination of wireless communication systems and wired communication systems.

Mobile navigation systems for automotive applications have become quite popular. With these automobile based navigation systems, an optical media is employed to store map information used for navigation purposes, e.g., road information, address information, etc. Such map information is quite voluminous, often requiring many CDs to store. Hand-held Global Positioning System (GPS) terminals have been available for some time and are commonly used. Due to the limited storage capabilities of many handheld terminals, storage of map segments used for navigational purposes has been limited. With such limitations, these wireless terminals were unable to provide more than minimal functionality. Further, with limited mapping ability and communication functions, these devices provided only limited usefulness. Thus, there is a need in the art for a wireless terminal having navigational capabilities that may be used to provide improved functionality.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
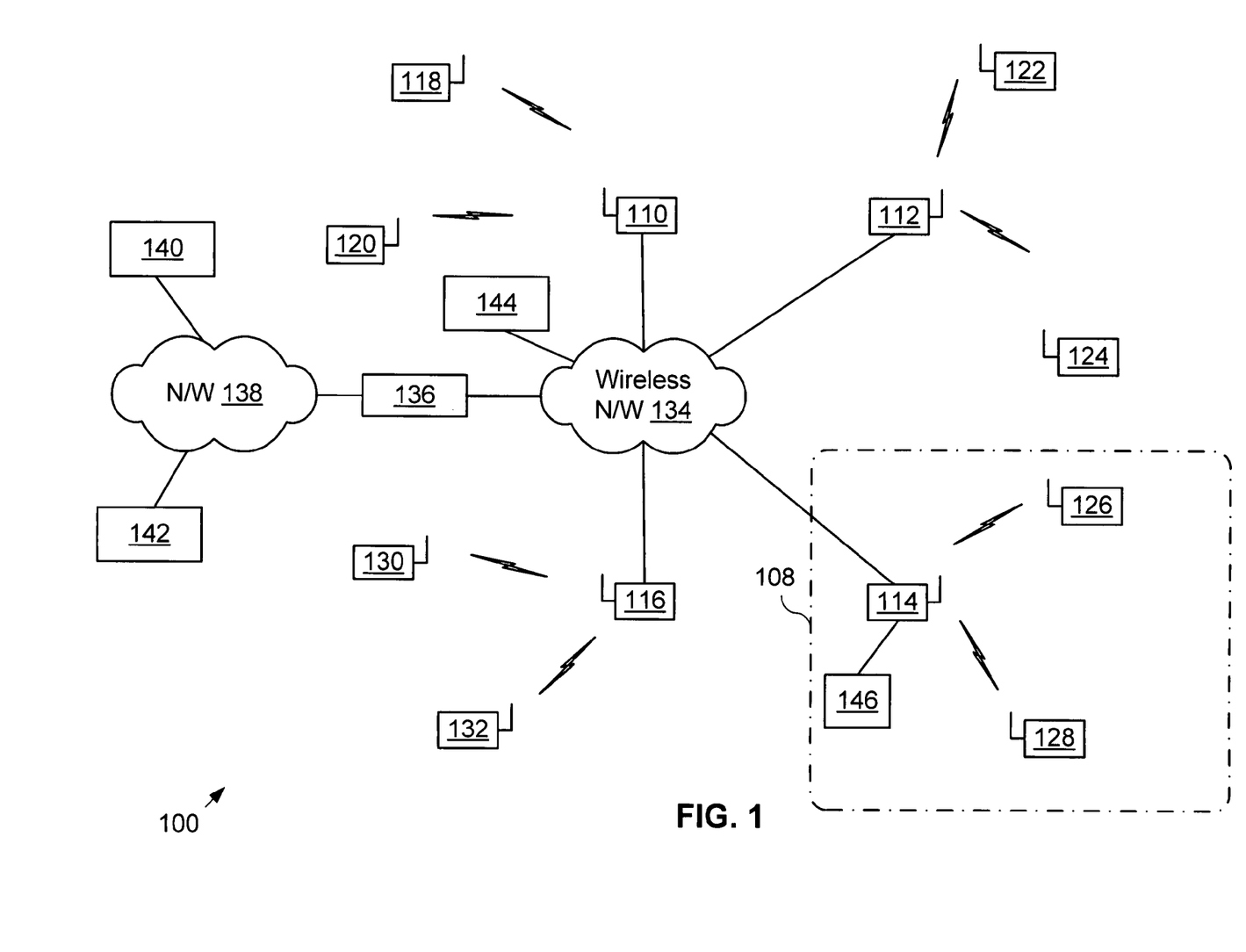
FIG. 1 is a system diagram illustrating a wireless communication system that operates according to the present invention.

FIG. 1 is a system diagram illustrating a wireless communication system that operates according to the present invention. The wireless communication system 100 of FIG. 1 includes one or more servicing base stations and/or wireless access points (WAPs) 110, 112, 114, and 116. The reader should understand that the structure of FIG. 1 is used only to convey the principles of the present invention and is not intended to be a detailed description of a cellular wireless communication system, a Wireless Local Area Network (WLAN), a Wireless Wide Area Network (WWAN), or a Wireless Personal Area Network (WPAN).

As is shown, base station/WAP 110 supports wireless terminals 118 and 120 within a respective serving area, e.g., cell, sector, premises, area, etc. Likewise, base station/WAP 112 supports wireless terminals 122 and 124, base station/WAP 114 supports wireless terminals 126 and 128 within premises 108, and base station/WAP 116 supports wireless terminals 130 and 132. The base stations/WAPs 110, 112, 114, and 116 are serviced via network backbone 134 and interface device 136. The interface device 136 couples the wireless backbone network 134 to another network 138. The another network 138 may include a Local Area Network (LAN), a Wide Area Network (WAN), the Internet, or any other type of network that couples the wireless backbone network backbone 134 via the network interface 136 to computers or terminals 140, 142, and 144, one, some or all of which may be map servers. Device 146 may be a server, telephone, or other device associated with the premises 108, which may be a business, residence, etc.

The operation of the wireless communication system 100 and of the wireless terminals 118-132 supported thereby will be described further with reference to FIGS. 2-7 and 9. The structure of the wireless terminals 118-132 will be described further with reference to FIG. 8. Generally, as will be described further with reference to FIGS. 2-4, a wireless terminal, e.g., 118, constructed and operating according to the present invention displays its location and a map segment on a display of the wireless terminal 118. Operation commences with the wireless terminal 118 accessing its GPS receiver to determine its location coordinates. Based upon its location coordinates, the wireless terminal 118 accesses a map segment. Accessing the map segment may include downloading the map segment from a servicing map server, e.g., 140, 142, 144, or 146, via a supporting wireless network infrastructure or, alternatively, accessing a map segment that is locally stored in memory, on storage media such as a CD or DVD, or on a hard disk drive.

Operation continues with the wireless terminal 118 determining its orientation with respect to a reference direction. The reference direction may be geographic North, magnetic North, or another reference direction that is fixed with respect to physical features of the map segment. The wireless terminal 118 then displays the map segment on its display such that the map segment is displayed in a correct orientation with respect to mapped physical features. The physical features of the map segment may include, for example, roads, intersections of roads, residences, businesses, train stations, bus stations, airports, points of interest, meeting places, museums, and other physical features that may be mapped. Finally, the wireless terminal 118 displays an icon on its display that represents the wireless terminal 118. The icon is displayed on the map segment at a location corresponding to the location coordinates of the wireless terminal 118. Thus, the display of the wireless terminal 118 not only indicates the correct position of the wireless terminal 118 with respect to mapped physical features on the display but orients the mapped physical features on the display so that they are oriented correctly with respect to the actual physical features.

Figure 2:
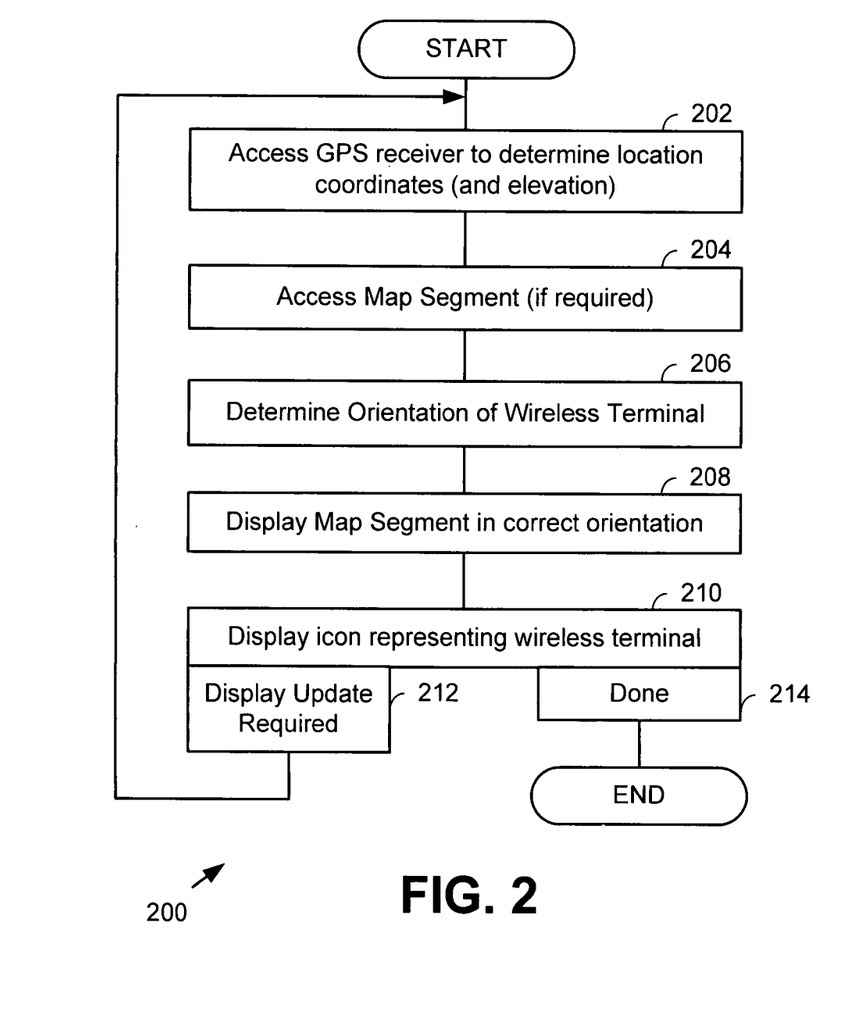
FIG. 2 is a flow chart illustrating a method for operating a wireless terminal according to the present invention in a compass mode.

FIG. 2 is a flow chart illustrating a method for operating a wireless terminal according to the present invention in a compass mode. The operation 200 of FIG. 2 commences with the wireless terminal accessing its GPS receiver to determine its location coordinates and optionally its elevation (Step 202). Operation continues with the wireless terminal accessing a map segment corresponding to the location coordinates of the wireless terminal (Step 202). The map segment may be accessed at a map server via the supporting wireless network infrastructure. Alternately, the map segment may be accessed locally in memory, a storage media such as a CD, DVD, mini CD, mini DVD, a hard disk drive, etc. The operation of Step 202 may further include the wireless terminal accessing the map segment based upon the elevation of the wireless terminal. Thus, if the wireless terminal is operating within a multiple story building, for example, the wireless terminal accesses a map segment corresponding to the appropriate floor or level.

Operation continues with the wireless terminal determining its orientation with respect to a reference direction (Step 206). As will be further illustrated in FIGS. 3 and 4 and described therewith, the reference direction may be geographic or magnetic North, for example. Operation continues with the wireless terminal displaying the map segment on its display based upon the orientation of the wireless terminal such that the map segment is displayed in the correct orientation with respect to mapped physical features (Step 208). With a user viewing the display of the wireless terminal, the mapped physical features will be displayed in a manner such that they correspond to the position of the actual physical features.

Operation continues in displaying an icon on the display of the wireless terminal (along with the map segment) that corresponds to the location coordinates of the wireless terminal (Step 210). Thus, the user would be able to view his or her location on the display of the wireless terminal in a proper location with respect to the mapped physical features. Also, the icon representing the wireless terminal may be presented in a correct orientation with respect to the mapped physical features of the map segment. Periodically, or when the wireless terminal has been reoriented or moved, a display update may be required (Step 212). If such a display update is required, operation proceeds to Step 202. Of course the wireless terminal may periodically access the GPS receiver to determine its location coordinates, which directly determines when display update is required. When the user no longer desires to display the map segment and icon regarding representing the wireless terminal on the display (Step 214), operation ends.

The mapped physical features may be, for example, roads, intersections of roads, residences, businesses, train stations, bus stations, airports, other points of interest, meeting places, and museums. Each of these mapped physical features may have included therewith additional information. Such additional information may include the address of the mapped physical feature, a telephone number corresponding to the mapped physical feature, an Internet address of the mapped physical feature, a fax number regarding to the mapped physical feature, or other information.

Figure 3:
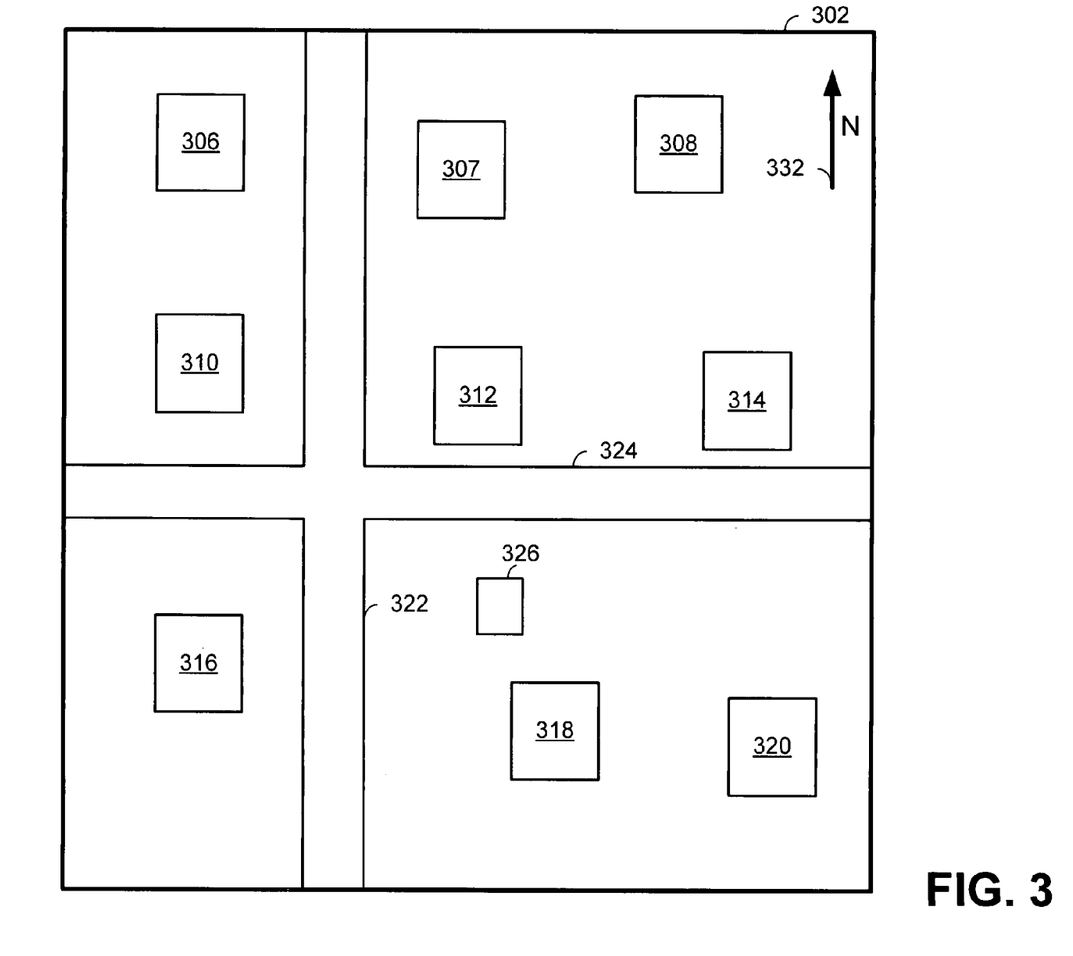
FIG. 3 is a block diagram representing a display of a wireless terminal in a first view operating according to the present invention in a compass mode.

FIG. 3 is a block diagram representing a display of a wireless terminal in a first view operating according to the present invention in a compass mode. As shown in FIG. 3, the display 302 of the tracking wireless terminal has displayed there upon a map segment along with an icon that represents wireless terminal 326. Shown in the map segment are mapped physical features 306, 307, 308, 310, 312, 314, 316, 318, and 320 that may be buildings, parks, landmarks, parking areas, or other mapped physical features identified within the map segment and mapped physical features 322 and 324 that represent roads (referred to hereinafter as 306-324). The wireless terminal may identify or provide additional information with regard to these mapped physical features 306-324. The actual size and shape of these mapped physical features 306-324 may be indicated in more detail than is shown in FIG. 3. The wireless terminal 326 is shown as an icon in the shape of a wireless terminal and oriented correctly with respect to reference direction 332 (geographic or magnetic North).

Figure 4:
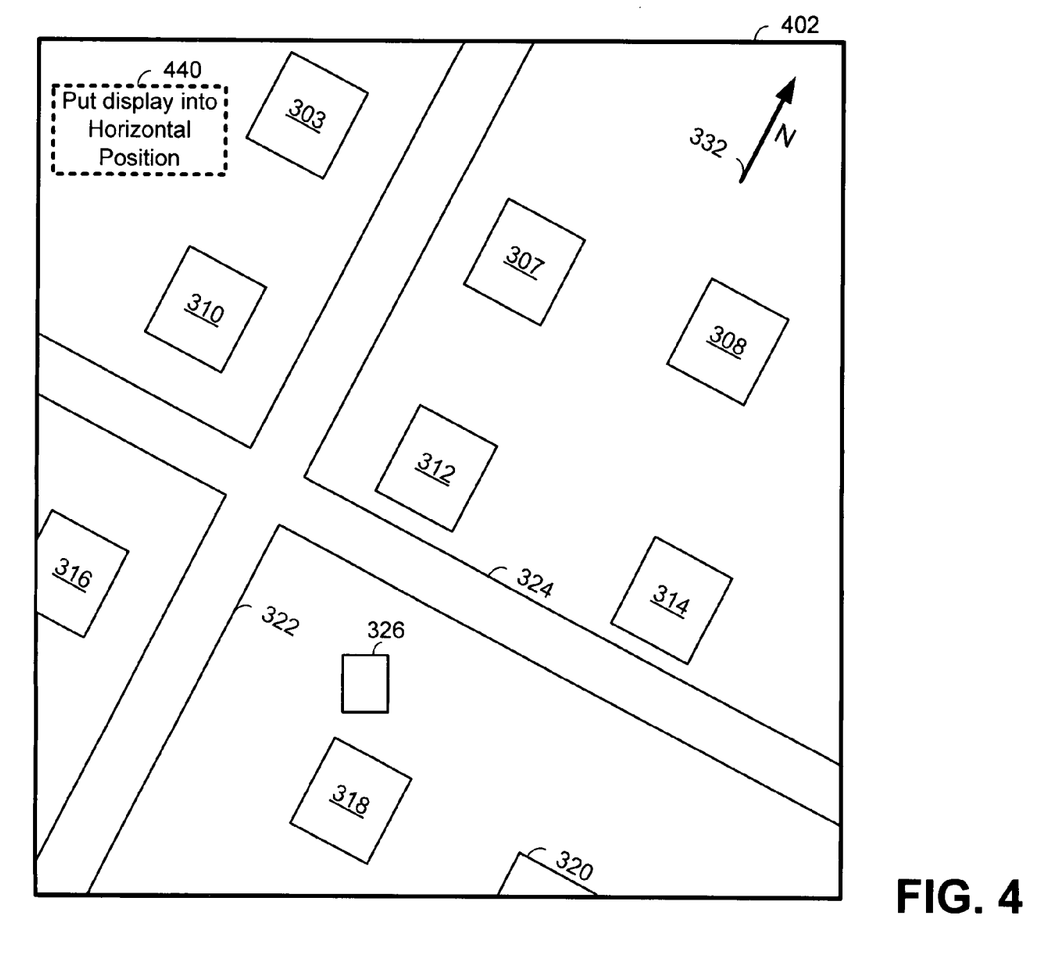
FIG. 4 is a block diagram representing a display operating in a second view according to the present invention when operating in a compass mode.

FIG. 4 is a block diagram representing a display 402 operating in a second view according to the present invention when operating in a compass mode. As shown in FIG. 4, the map segment on display 402 has been oriented based upon the orientation of the wireless terminal 326 with respect to a reference direction 332 (North) so that the physical features 306-324 of the map segment are displayed in a correct orientation with respect to the orientation of the wireless terminal 326. As is shown, the North vector 332 is not oriented vertically on the display 402. Thus, as compared to the display 302 of FIG. 3, the wireless terminal 326 resides in a different physical orientation with respect to the reference direction 332. The teachings illustrated in FIGS. 3 and 4 may be easily extended to any particular orientation of the wireless terminal 326. Based upon the particular orientation of the wireless terminal 326, the reference numerals and information relating to the physical features may be oriented in different directions for easier access by the user of the wireless terminal 326. Note that the icon representing the wireless terminal 326 orients correctly with respect to the reference direction 332, indicating how the wireless terminal 326 is currently being held by the user with respect to the reference direction 332.

Note that the operations of FIGS. 2-4 work best when a plane of the display 402 orients substantially in parallel to the surface of the earth. In this orientation, a reference direction of the wireless terminal, e.g., a side of the display 402, may most easily be compared to the reference direction 332. Thus, the display 402 may include a warning 440 directing the user to place the display into a horizontal position. With the display 402 in the horizontal position the geographic features 306-324 of the map segment may be most easily displayed in a correct orientation with reference to the orientation of the wireless terminal. With the display 402 not in a horizontal position, two separate operations may be employed. The relative orientation of the wireless terminal with respect to the reference direction may be best estimated and the display 402 updated based upon the best estimate. Alternately, the wireless terminal may use a last valid estimate of the relative orientation of the wireless terminal with respect to the reference direction.

Figure 5:
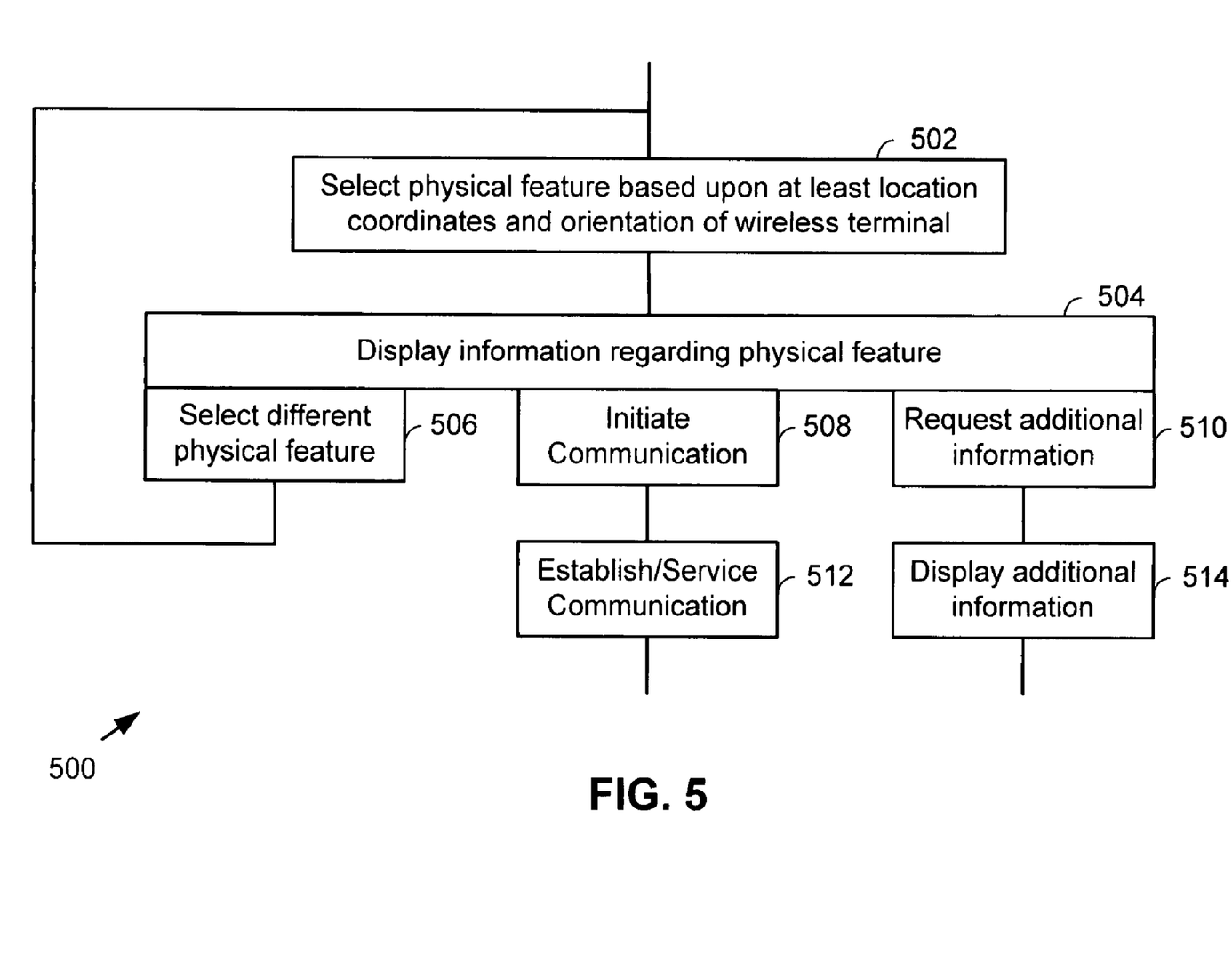
FIG. 5 is a flow chart illustrating operation according to another aspect of the present invention in providing information regarding selected physical features.

FIG. 5 is a flow chart illustrating operation according to another aspect of the present invention in providing information regarding selected physical features. The operations 500 of FIG. 5 may be performed in conjunction with Step 210 of FIG. 2. Alternately, the operations 502-514 of FIG. 5 may be performed between Steps 210 and 212 or Step 214 of FIG. 2. Of course, the operations of FIG. 5 may be performed in other manners as well.

Operation according to the illustrated aspect of the present invention includes selecting one or more physical features of a plurality of mapped physical features based upon at least the location coordinates and orientation of the wireless terminal (Step 502). According to one operation of this aspect, the wireless terminal selects one physical feature of the mapped physical features. According to another operation of this aspect, the wireless terminal selects a group of physical features of the mapped physical features. In either case, the physical feature of the mapped physical feature or the group of physical features may be selected based upon additional criteria. Such additional criteria may include a filtering criteria established by the user. For example, if the user is looking for restaurants of a particular type, particular filtering criteria will be used to select physical features that are restaurants of the particular type. Likewise, if the user desires to locate a hot spot for WLAN access, the wireless terminal would select physical features corresponding to only WLAN hot spots. Additional filtering criteria could include the time of day. By using the time of day, the wireless terminal would be able to determine businesses that are currently open and select such businesses for access by the user of the wireless terminal. For example, if the user of the wireless terminal desires to locate all restaurants within a one-mile boundary that are currently open, the wireless terminal would use a corresponding filter to select only such restaurants within the group of physical features selected.

After selecting either the single physical feature of the mapped physical features or the group of physical features of the mapped physical features, the wireless terminal displays information regarding the selected physical feature(s) to the user via the user interface, e.g., display, of the wireless terminal (Step 504). Because the ability of the wireless terminal to display information regarding the physical features may be limited, the wireless terminal may display information regarding only a single physical feature at a time. Alternately, the wireless terminal may display categories of information regarding the selected physical feature(s).

The user may select a different physical feature of the selected group of mapped physical features (Step 506). Based upon input received at step 504, operation proceeds to Step 502 where the wireless terminal selects a different physical feature. The wireless terminal may allow the user to toggle or move between the physical features of the selected group of physical features.

Based upon the information that is displayed on the display of the wireless terminal, the user of the wireless terminal may desire to initiate communications with a communication device associated with the selected physical feature. In such case, the user requests establishment of communication with the associated communication device (Step 508). In response, the wireless terminal initiates a communication to the communication device associated with the selected physical feature (Step 512). With the communication established, the user of the wireless terminal may interact directly with the communication device associated with the selected physical feature to obtain information therefrom or initiate a transaction therewith. For example, the user may speak directly to a representative of the selected physical feature, may interact with a server computer associated with the selected physical feature, or otherwise interact with the communication device of the selected physical feature. In this case, the user of the wireless terminal may order food, order goods, order tickets, or perform another transaction with a business that is the selected physical feature.

Because the wireless terminal will typically have limited ability to display information regarding a selected physical feature or a group of selected physical features, the user may request additional information regarding the physical feature or group of physical features (Step 510). This request may be received by the wireless terminal via a cursor input, keypad input, voice activated command input or other input types that are supported by the wireless terminal. In response to this information request, the wireless terminal will display additional information regarding the selected physical feature or selected group of physical features (step 514).

Figure 6:
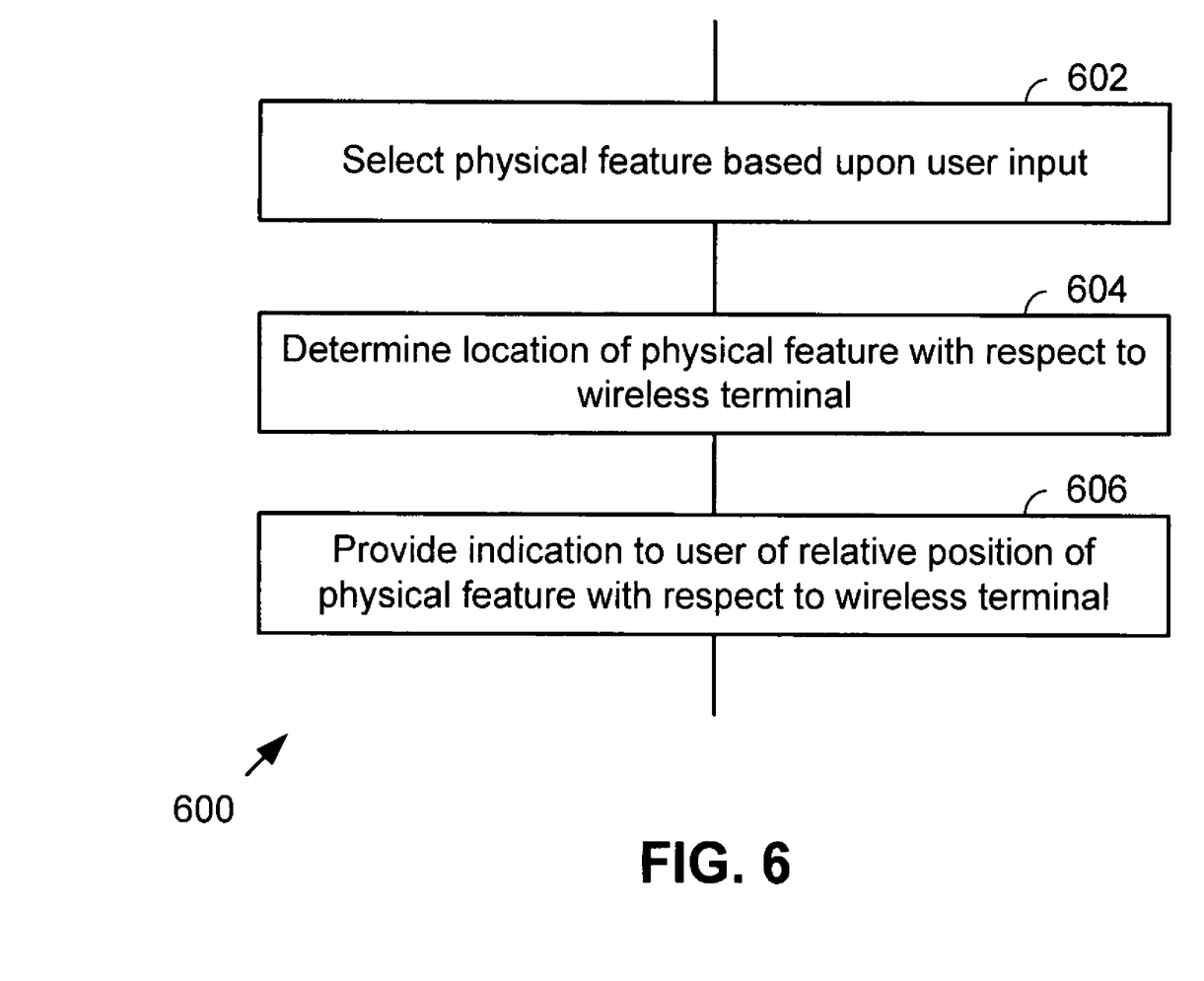
FIG. 6 is a flow chart illustrating operation according to another aspect of the present invention in indicating to a user proximity to a selected physical feature.

FIG. 6 is a flow chart illustrating operation according to another aspect of the present invention in indicating to a user proximity to a selected physical feature. The operations 600 of FIG. 6 may be performed between steps 210 and 212 of FIG. 2, for example. Operation 600 commences with the user selecting a physical feature of the mapped physical features (Step 602). Such selection may be made via a cursor input, keystroke input, voice input, or other means supported by the user interface of the wireless terminal. Operation continues with the wireless terminal determining the location of the physical feature with respect to the wireless terminal (Step 604). In determining the location of the physical feature with respect to the wireless terminal, the location coordinates of the selected physical feature as well as the location coordinates of the wireless terminal are determined. In determining the relative position at Step 604, the orientation of the wireless terminal with respect to the reference direction may also be considered.

The wireless terminal then provides an indication to the user regarding the relative position of the selected physical feature with respect to the wireless terminal (Step 606). The indication may be provided in one or more of a number of various ways. For example, the wireless terminal may provide a flashing light having a flashing pattern corresponding to proximity of the wireless terminal to the selected physical feature. Alternatively, the wireless terminal could provide an audible alarm having an audible pattern corresponding to proximity of the wireless terminal to the selected physical feature. Further, the wireless terminal could provide a visual meter reading having an indicated magnitude corresponding to proximity of the wireless terminal to the selected physical feature. Further, the indication could include a visual vector reading having an indicated magnitude and direction corresponding to a relative position of the wireless terminal with respect to the selected physical feature. With any of these indications, the user of the wireless terminal may reference the wireless terminal in determining how to reach the selected physical feature. For example, when the user of the wireless terminal desires to reach a restaurant, a WLAN hot spot, or another selected physical location, the user of the wireless terminal could use such indication provided by the wireless terminal to most directly reach the selected physical feature.

Figure 7:
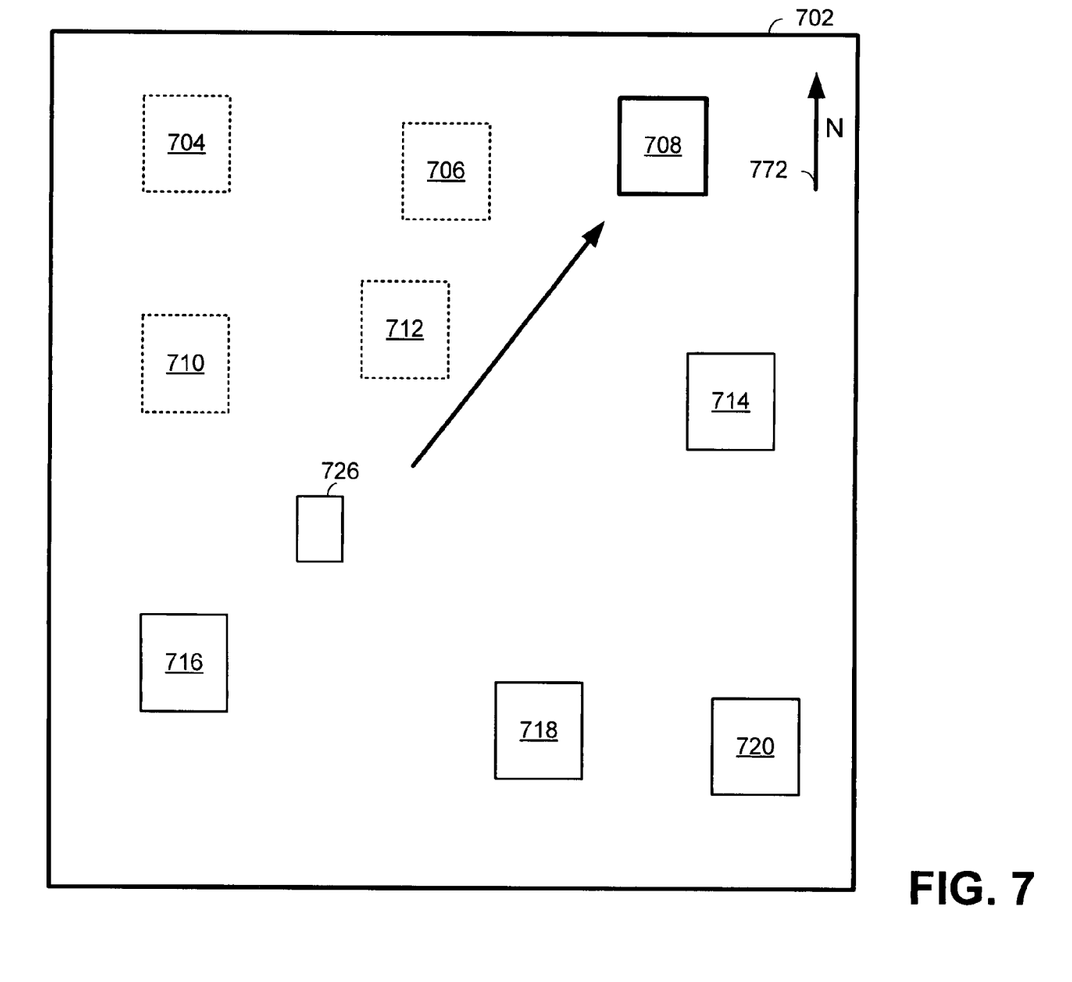
FIG. 7 is a block diagram illustrating a display of a wireless terminal used to further illustrate the teachings of the operations of FIGS. 5 and 6.

FIG. 7 is a block diagram illustrating a display of a wireless terminal used to further illustrate the teachings of the operations of FIGS. 5 and 6. The display 702 of FIG. 7 has displayed thereon a map segment having a plurality of mapped physical features 704-720. Each of these mapped physical features may represent a building, residence, train station, bus station, airport, point of interest, meeting place, museum, or another type of physical feature. As is shown in FIG. 7 as well, reference direction 772 (North) is shown to orient in parallel with one edge of the display. In such case, the user of the wireless terminal is holding the wireless terminal such that one of its display edges is parallel with North.

A wireless terminal 726 is shown in an accurate position with respect to the plurality of mapped physical features 704-720. In referring to the operations of FIG. 5, based upon the location coordinates of the wireless terminal, the orientation of the wireless terminal, and perhaps other criteria, the wireless terminal selects a group of physical features that include physical features 704, 706, 710, and 712. These physical features 704, 706, 710, and 712 are shown with dotted boundaries to indicate that they belong to the group of selected physical features. Based upon this selection, the user terminal may display information regarding the physical features of the group of selected physical features. Further, the wireless terminal may allow the user to toggle among physical features 704, 706, 710 and 712 using cursor input or another input. Based upon a selected physical feature of this group of physical features the wireless terminal may display particular information regarding the selected physical feature.

According to the operations previously described with reference to FIG. 6, the wireless terminal may provide an indication regarding the relative position of the wireless terminal 726 with respect to a selected physical feature, e.g., 708. In such case, the user of the wireless terminal 726 may use the proximity indication provided by wireless terminal to reach physical feature 708. In such case, the wireless terminal may provide a vector reading showing a particular direction to the selected physical feature 708 from a current location of the wireless terminal indicated as icon 726. The indication may provide additional information in an audible or another visual means to assist the user in reaching physical feature 708.

Figure 8:
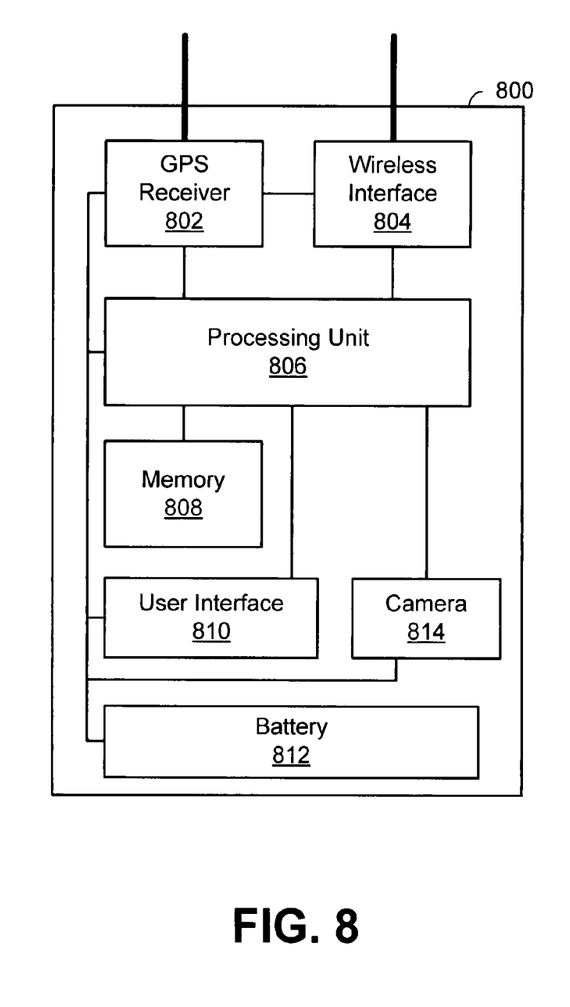
FIG. 8 is a block diagram illustrating a wireless terminal constructed according to the present invention.

FIG. 8 is a block diagram illustrating a wireless terminal constructed according to the present invention. As shown in FIG. 8, the wireless terminal 800 includes a GPS receiver 802, a wireless interface 804, a processing unit 806, memory 808, user interface 810, and a battery 812. The components of the wireless terminal 800 are typically contained within a hard case that provides protection from the elements. The wireless terminal 800 may include a camera. The wireless interface 804 will have particular structure and functionality based upon the type of the wireless terminal 800. For example, when the wireless terminal 800 is a cellular telephone, the wireless interface 804 will support a corresponding interface standard e.g., GSM, GPRS, EDGE, UMTS, 1xRTT, 1xEV-DO, 1xEV-DV, etc. The wireless interface 804 of the cellular telephone 804 may also/alternately support WWAN, WLAN, and/or WPAN functionality. When the wireless terminal is a WLAN terminal for example, the wireless interface 804 will support standardized communication according to the IEEE 802.11x group of standards, for example. When the wireless terminal is a WPAN device, the wireless interface 804 would support the Bluetooth interface standard or another WPAN standard such as the 802.15 standard. In any case, the wireless interface 804 may support all or a subset of cellular telephone, WLAN, and WPAN operations.

The processing unit 806 may include any type of processor such as a microprocessor, a digital signal processor, an Application Specific Integrated Circuit (ASIC), or a combination of processing type devices. The processing unit 806 is operable to execute a plurality of software instructions that are stored in memory 808 and downloaded for execution. The processing unit 806 may also include specialized hardware required to implement particular aspects of the present invention. Memory 808 may include SRAM, DRAM, PROM, flash RAM, a hard disk drive, an optical media drive, or any other type of memory capable of storing data and instructions.

A user interface 810 may include a microphone, a speaker, a keypad, a screen, a touch screen, a light, a voice recognition system, an optical recognition system that would authenticate a user's iris, for example, and/or any other type of interface that may be employed in the wireless terminal. In some embodiments, the user interface 810 may include therewith ability to service a headset including microphone and earpiece for the user. In some embodiments of the wireless terminal 800, the user interface 810 is of reduced functionality to minimize the size of the wireless terminal 800. In such case, programming of the wireless terminal 800 may be performed via the wireless interface 804. In such case, the wireless terminal 800 may be small enough to be worn around a child's wrist, around the neck, pinned to the inside of clothing, placed in a pocket, or concealed upon the person. Battery 812 powers the components of the wireless terminal 800.

Figure 9:
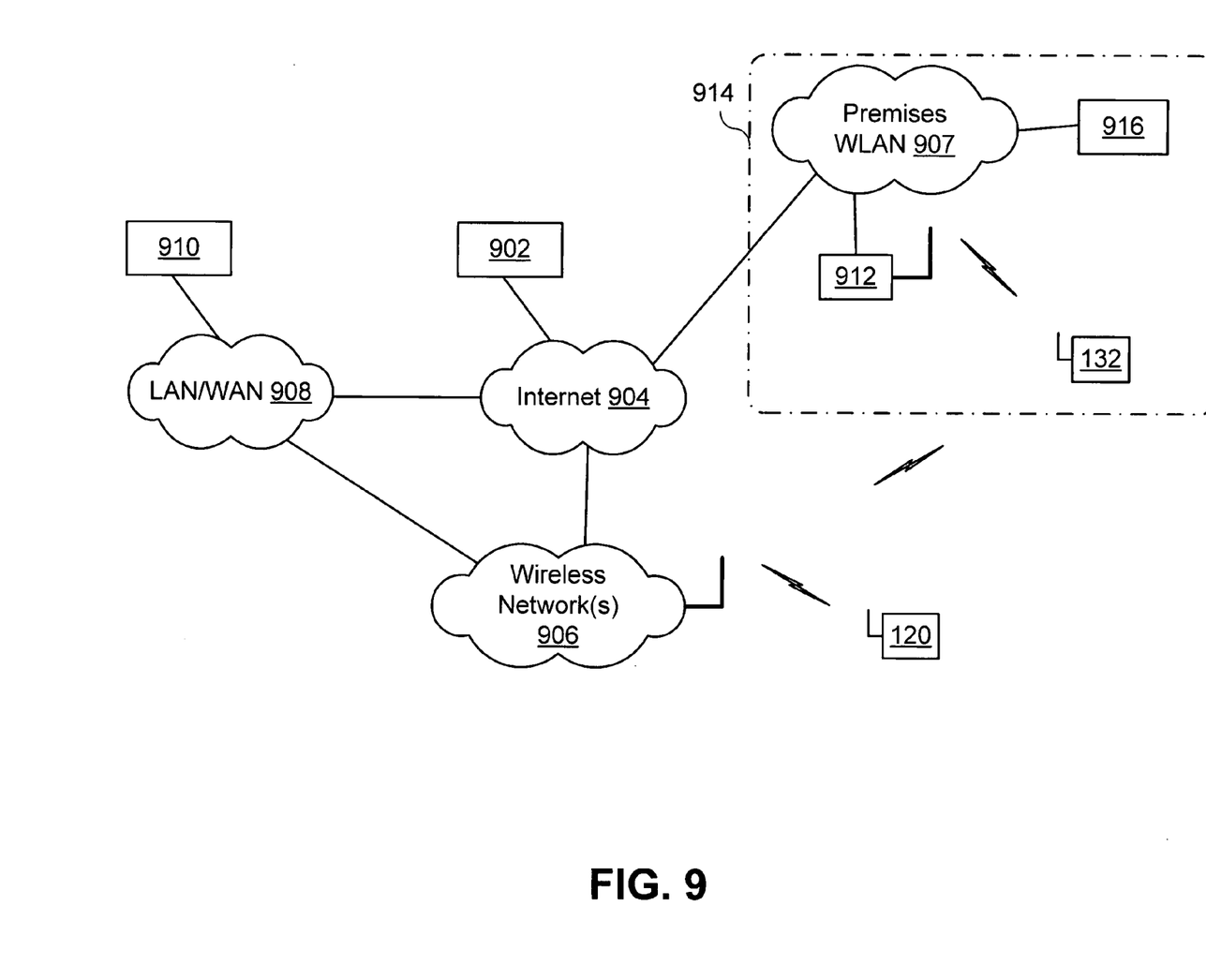
FIG. 9 is a system diagram illustrating a system that may be used according to the present invention.

FIG. 9 is a system diagram illustrating a system that may be used according to the present invention. The system of FIG. 9 includes map servers 902 and 910, wireless network(s) 906, Internet 904, LAN/WAN 908, premises WLAN 907, premises map server 916, and WAP 912. The premises WAP 912 services premises 914 and supports wireless communications with wireless terminal 132 when located within the premises 914. Wireless network 906 supports wireless communications for both wireless terminal 120 and 132. Wireless network 906 may be a cellular wireless communication system, a WWAN communication system, or another wireless communication system that services areas outside of premises 914. Map server 902 or 910 may service a map download request from wireless terminal 120 and/or 132. The map download would also be supported by LAN/WAN 908, Internet 904, and/or wireless network 906.

When wireless terminal 132 enters premises 914, it may establish communications with premises WAP 912. Via premises WAP 912, wireless terminal 132 may access map server 916 via the premises WLAN 907 and WAP 912. Upon this access, the premises map server downloads a premises map to wireless terminal 132 for display on the display of the wireless terminal. This premises map will typically include a plurality of points-of-interest located within premises 914. Premises map would also include GPS coordinates respective to the plurality points-of-interest within the premises 914. Further, the map segment may include offers available within premises. For example, if the premises includes a number of stores and is a shopping mall, the premises map may include special offers not otherwise available causing customer/user of wireless terminal 132 to move to particular stores. The wireless terminal having received the map segment of the premises map from the map server, map server 916, would be able to receive the special offer.

As one of average skill in the art will appreciate, the term "substantially" or "approximately," as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the terms "communicatively coupled" or "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled." As one of average skill in the art will further appreciate, the term "compares favorably," as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents, and alternatives falling within the spirit and scope of the present invention as defined by the claims.

The invention claimed is:

1. A method for operating a wireless terminal to display its location and a map segment on a display of the wireless terminal, the method comprising:
   accessing a Global Positioning System (GPS) receiver of the wireless terminal to determine location coordinates of the wireless terminal;
   accessing a map segment corresponding to the location coordinates of the wireless terminal;
   determining an orientation of the wireless terminal with respect to a reference direction;
   detecting that the wireless terminal is not in a substantially horizontal position;
   indicating upon the display that the wireless terminal is not in a substantially horizontal position;
   subsequently detecting that the wireless terminal is in a substantially horizontal position;
   displaying the map segment on the display of the wireless terminal based upon the orientation of the wireless terminal so that the map segment is displayed in a correct orientation with respect to mapped physical features when the wireless terminal is in a substantially horizontal position;
   displaying an icon that represents the wireless terminal on the display, the icon displayed on the map segment at a location corresponding to the location coordinates;
   receiving user input regarding a selected physical feature of the mapped physical features; and
   initiating a voice communication to a communication device associated with the selected physical feature based upon at least the user input.

2. The method of claim 1, wherein the mapped physical features are selected from the group consisting of at least roads, intersections of roads, residences, businesses, train stations, bus stations, airports, points of interest, meeting places, and museums.

3. The method of claim 1, further comprising:
   based upon the location coordinates of the wireless terminal and the orientation of the wireless terminal with respect to the reference direction, selecting a physical feature of the mapped physical features; and
   displaying information regarding the selected physical feature of the mapped physical features to a user of the wireless terminal via a user interface.

4. The method of claim 3, wherein selecting a physical feature of the mapped physical features is further based upon at least one of:
   a filtering criteria established by the user;
   user input received via the user interface; and
   a time of day.

5. The method of claim 3, further comprising:
   in response to user input received via the user interface, selecting a different physical feature of the mapped physical features; and
   displaying information regarding the different selected physical feature of the mapped physical features to a user of the wireless terminal via the user interface.

6. The method of claim 1, further comprising:
   based upon the location coordinates of the wireless terminal and the orientation of the wireless terminal with respect to the reference direction, selecting a group of physical features of the mapped physical features;
   based upon user input, selecting a physical feature of the group of physical features of the mapped physical features; and
   displaying information regarding the selected physical feature of the group of physical features of the mapped physical features to a user of the wireless terminal via a user interface.

7. The method of claim 6, further comprising:
   based upon user input, selecting a different physical feature of the selected group of physical features of the mapped physical features; and
   displaying information regarding the different selected physical feature of the mapped physical features to the user of the wireless terminal via a user interface.

8. The method of claim 1:
   further comprising determining an elevation of the wireless terminal; and
   wherein the map segment corresponds to both the location coordinates of the wireless terminal and the elevation of the wireless terminal.

9. The method of claim 1, further comprising:
   selecting a physical feature of the mapped physical features based upon user input; and
   providing an indication to a user of the wireless terminal regarding the relative position of the wireless terminal with respect to the selected physical feature.

10. The method of claim 9, wherein the indication is selected from the group consisting of at least:
   a flashing light having a flashing pattern corresponding to proximity of the wireless terminal to the selected physical feature;
   an audible alarm having an audible pattern corresponding to proximity of the wireless terminal to the selected physical feature;
   a visual meter reading having an indicated magnitude corresponding to a proximity of the wireless terminal to the selected physical feature; and a visual vector reading having an indicated magnitude and direction corresponding to a relative position of the wireless terminal with respect to the selected physical feature.

11. The method terminal of claim 1, wherein the icon that represents the wireless terminal orients correctly with respect to orientations of icons representing the mapped physical features.

12. A wireless terminal comprising:
a wireless interface;
a user interface including a display;
a Global Positioning System (GPS) receiver; and
a processing unit communicatively coupled to the wireless interface, the user interface, and the GPS receiver and operable to:
   access the GPS receiver to determine location coordinates of the wireless terminal;
   access a map segment corresponding to the location coordinates of the wireless terminal;
   determine an orientation of the wireless terminal with respect to a reference direction;
   detect that the wireless terminal is not in a substantially horizontal position;
   indicate via the user interface that the wireless terminal is not in a substantially horizontal position;
   subsequently detect that the wireless terminal is in a substantially horizontal position;
   display the map segment on the display of the wireless terminal based upon the orientation of the wireless terminal so that the map segment is displayed in a correct orientation with respect to mapped physical features when the wireless terminal is in a substantially horizontal position;
   display an icon that represents the wireless terminal on the display, the icon displayed on the map segment at a location corresponding to the location coordinates;
   receive user input via the user interface regarding a selected physical feature of the mapped physical features; and
   initiate a voice communication via the user interface and the wireless interface to a communication device associated with the selected physical feature based upon at least the user input.

13. The wireless terminal of claim 12, wherein the mapped physical features are selected from the group consisting of at least roads, intersections of roads, residences, businesses, train stations, bus stations, airports, points of interest, meeting places, and museums.

14. The wireless terminal of claim 12 wherein the processing unit is further operable to:
   based upon the location coordinates of the wireless terminal and the orientation of the wireless terminal with respect to the reference direction, select a physical feature of the mapped physical features; and
   display information regarding the selected physical feature of the mapped physical features to a user of the wireless terminal via the user interface.

15. The wireless terminal of claim 14, wherein in selecting a physical feature of the mapped physical features, the processing unit is operable to further employ at least one of:
   a filtering criteria established by the user;
   user input; and
   a time of day.

16. The wireless terminal of claim 14, wherein the processing unit is further operable to:
   in response to user input received via a user interface, select a different physical feature of the mapped physical features; and
   display information regarding the different selected physical feature of the mapped physical features to a user of the wireless terminal via a user interface.

17. The wireless terminal of claim 12, wherein the processing unit is further operable to:
   based upon the location coordinates of the wireless terminal and the orientation of the wireless terminal with respect to the reference direction, select a group of physical features of the mapped physical features;
   based upon user input received via the user interface, select a physical feature of the group of physical features of the mapped physical features; and
   display information regarding the selected physical feature of the group of physical features of the mapped physical features to a user of the wireless terminal via the user interface.

18. The wireless terminal of claim 17, wherein the processing unit is further operable to:
   based upon user input, select a different physical feature of the selected group of physical features of the mapped physical features; and
   display information regarding the different selected physical feature of the mapped physical features via a user interface.

19. The wireless terminal of claim 12, wherein the processing unit is further operable to:
   determine an elevation of the wireless terminal; and
   select the map segment based upon both the location coordinates of the wireless terminal and the elevation of the wireless terminal.

20. The wireless terminal of claim 12, wherein the processing unit is further operable to:
   select a physical feature of the mapped physical features based upon user input; and
   provide an indication regarding the relative position of the wireless terminal with respect to the selected physical feature.

21. The wireless terminal of claim 20, wherein the indication is selected from the group consisting of at least:
   a flashing light having a flashing pattern corresponding to proximity of the wireless terminal to the selected physical feature;
   an audible alarm having an audible pattern corresponding to proximity of the wireless terminal to the selected physical feature;
   a visual meter reading having an indicated magnitude corresponding to a proximity of the wireless terminal to the selected physical feature; and
   a visual vector reading having an indicated magnitude and direction corresponding to a relative position of the wireless terminal with respect to the selected physical feature.

22. The wireless terminal of claim 12, wherein the icons that represents the wireless terminal orients correctly with respect to orientations of icons representing the mapped physical features.

* * * * *